(12) United States Patent
Kiran et al.

(10) Patent No.: US 11,155,295 B2
(45) Date of Patent: Oct. 26, 2021

(54) HYDRAULIC STEERING UNIT

(71) Applicant: Danfoss Power Solutions ApS, Nordborg (DK)

(72) Inventors: Paul Kiran, Nordborg (DK); Niels Arbjerg, Sydals (DK); Mogens Frederiksen, Sydals (DK)

(73) Assignee: Danfoss Power Solutions ApS, Nordborg (DK)

( * ) Notice: Subject to any disclaimer, the term of this patent is extended or adjusted under 35 U.S.C. 154(b) by 171 days.

(21) Appl. No.: 16/711,555

(22) Filed: Dec. 12, 2019

(65) Prior Publication Data

US 2020/0198698 A1 Jun. 25, 2020

(30) Foreign Application Priority Data

Dec. 21, 2018 (DE) .......................... 102018133300.5

(51) Int. Cl.
| | |
|---|---|
| *B62D 5/065* | (2006.01) |
| *B62D 5/06* | (2006.01) |
| *B62D 5/093* | (2006.01) |
| *B62D 5/08* | (2006.01) |
| *B62D 5/083* | (2006.01) |
| *B62D 3/14* | (2006.01) |
| *B62D 5/10* | (2006.01) |

(52) U.S. Cl.
CPC ............... *B62D 5/065* (2013.01); *B62D 3/14* (2013.01); *B62D 5/061* (2013.01); *B62D 5/062* (2013.01); *B62D 5/08* (2013.01); *B62D 5/083* (2013.01); *B62D 5/093* (2013.01); *B62D 5/10* (2013.01)

(58) Field of Classification Search
CPC .......... B62D 5/065; B62D 5/093; B62D 5/08; B62D 5/083; B62D 5/061; B62D 5/062; B62D 3/14; B62D 5/10

USPC ......................................................... 180/441
See application file for complete search history.

(56) References Cited

U.S. PATENT DOCUMENTS

| 5,515,938 A * | 5/1996 | Haga ...................... B62D 5/083 |
|---|---|---|
| | | 180/417 |
| 2018/0319429 A1* | 11/2018 | Arbjerg .................... B62D 5/14 |

FOREIGN PATENT DOCUMENTS

| DE | 102005011526 A1 | 10/2006 |
|---|---|---|
| EP | 2 127 998 A1 | 12/2019 |

OTHER PUBLICATIONS

First Examination Report for Indian Patent Application No. 201914051557 dated Jan. 20, 2021.

* cited by examiner

*Primary Examiner* — Tony H Winner
*Assistant Examiner* — Felicia L. Brittman
(74) *Attorney, Agent, or Firm* — McCormick, Paulding & Huber PLLC

(57) ABSTRACT

A hydraulic steering unit includes a pressure port connected to a main flow path and a tank port connected to a tank flow path, left and right working ports connected to left and right working flow paths, respectively, a bridge arrangement of variable orifices having a first left orifice connected to the main flow path and to the left working flow path, a first right orifice connected to the main flow path and to the right working flow path, a second left orifice connected to the left working flow path and to the tank flow path, and a second right orifice connected to the right working flow path and to the tank flow path. A variable diagonal orifice is connected to the main flow path and to the tank flow path. The bridge arrangement orifices being closed in neutral position and the diagonal orifice being open in neutral position.

17 Claims, 2 Drawing Sheets

HYDRAULIC STEERING UNIT

CROSS-REFERENCE TO RELATED APPLICATION

This application claims foreign priority benefits under 35 U.S.C. § 119 to German Patent Application No. 102018133300.5 filed on Dec. 21, 2018, the content of which is hereby incorporated by reference in its entirety.

TECHNICAL FIELD

The present invention relates to a hydraulic steering unit comprising a supply port arrangement having a pressure port connected to a main flow path and a tank port connected to a tank flow path, a working port arrangement having a left working port connected to a left working flow path and a right working port connected to a right working flow path, a bridge arrangement of variable orifices having a first left orifice connected to the main flow path and to the left working flow path, a first right orifice connected to the main flow path and to the right working flow path, a second left orifice connected to the left working flow path and to the tank flow path, and a second right orifice connect to the right working flow path and to the tank flow path.

BACKGROUND

Such a steering unit is known, for example, from DE 10 2005 011 526 A1. The orifices form a kind of Wheatstone bridge. One diagonal of the Wheatstone bridge is connected to the main flow path and the tank flow path and the other diagonal of the bridge is connected to the two working flow paths. When a vehicle equipped with such a steering unit is to be steered, two orifices of the bridge are opened at the same time to allow a flow of hydraulic fluid from the pressure port to one of the working ports and from the other of the working ports back to the tank port.

When such a steering unit is used for the steering of an agriculture vehicle, for example a harvester, it is sometimes not desired to have a self-alignment of the steered wheels. This is, however, difficult to achieve with a steering unit having the above-mentioned bridge arrangement.

SUMMARY

The object underlying the invention is to have a hydraulic steering unit without self-alignment and with comfortable feeling for the driver.

This object is solved with a hydraulic steering unit as described at the outset in that a variable diagonal orifice is connect to the main flow path and to the tank flow path, wherein the orifices of the bridge arrangement are closed in neutral position and the diagonal orifice is open in neutral position.

When the orifices of the bridge arrangement are closed in neutral position to prevent a self-alignment there is no possibility for the flow of hydraulic fluid to come from the pressure port to one of the working ports or to return from the other of the two working ports to the tank ports. However, since the diagonal orifice is open in neutral position, a flow of hydraulic fluid is still allowed through the steering unit from the pressure ports to the tank port so that there is no sudden pressure increase once a steering wheel or any other steering command device is actuated by the driver. The diagonal orifice is preferably arranged in a diagonal of the bridge arrangement.

In the present application the term "orifice" is not limited to a single bleed or a single throttling device. An orifice can be formed by two or more bleeds or other throttling devices which can be arranged in series and/or in parallel.

In an embodiment of the invention in a range around the neutral position the diagonal orifice and the orifices of the bridge arrangement are open. In other words, there is an overlapping range in which hydraulic fluid can be controlled by the orifices of the bridge arrangement to establish the flow from the pressure port to one of the working ports and back from the other working port to the tank port and at the same time allow a flow of fluid through the diagonal orifice. However, this range can be quite small, for example covering a range between −2.5° and +2.5° excluding the neutral position.

In an embodiment of the invention the first left orifice opens faster than the second right orifice and the first right orifice opens faster than the second left orifice. When a vehicle equipped with such a steering unit is steered to the left, for example, the first left orifice and the second right orifice are opened. When the vehicle is steered to the right, the first right orifice and the second left orifice are opened. When the respective first orifice is opened faster, there can be achieved a steeper increase in pressure acting on a steering motor connected to the two working ports. This is true for both steering directions.

In an embodiment of the invention a main orifice is arranged in the main flow path, wherein the main orifice is open in neutral position. The opening degree of the main orifice in neutral position is a minimum open degree. The main orifice allows a small flow of fluid through the diagonal orifice in the neutral position.

In an embodiment of the invention a measuring motor is arranged in one of the working flow paths. This is in particular of advantage in connection with the bridge arrangement. The measuring motor in the working flow path is driven exactly by the amount of hydraulic fluid flowing from the supply port to the working port or back from the other working port to the tank port. The orifices are in this case preferably formed by an arrangement of a spool and a sleeve. The steering wheel or any other steering command means drives spool or sleeve in rotational direction in relation to sleeve or spool. The other element, i. e. sleeve or other spool is operatively connected to the measuring motor. The rotational movement between sleeve and spool opens some orifices and closes other orifices so that a flow of fluid can pass from the pressure port to one of the working ports and back from the other of the working ports to the tank port. This flow of fluid drives the measuring motor which restores spool and sleeve to their initial or neutral position once the required amount of hydraulic fluid has been supplied to the working port arrangement.

In an embodiment of the invention an auxiliary orifice is arranged between the main flow path and the tank flow path, wherein the auxiliary orifice and the diagonal orifice are open in different angular ranges. The auxiliary orifice can be used to establish a flow of hydraulic fluid out of the neutral position, if necessary. The auxiliary orifice is likewise preferably arranged in a diagonal of the bridge arrangement.

In an embodiment of the invention the auxiliary orifice is open only in an outermost angular range. The auxiliary orifice can be used to give an end-stop feeling to the driver of the vehicle. This is achieved by allowing a flow of hydraulic fluid from the pressure port to the tank port. Even if there are no specific throttling means in this path, the pressure in the tank flow path is increased which can be felt by the driver so that there is an increased resistance against rotation of the steering wheel. Since the auxiliary orifice is open only in an outermost angular range, this feeling is generated only at the end of the possible rotational movement of the steering wheel.

In an embodiment of the invention the auxiliary orifice allows a flow of fluid only into a working flow path in which the measuring motor is not arranged. In other words, the auxiliary orifice opens only in a direction, in which a respective working flow path is not provided with the measuring motor for this steering direction the pressure in the tank flow path is large enough.

BRIEF DESCRIPTION OF THE DRAWINGS

An embodiment of the invention will now be described in more detail with reference to the drawing, in which.

DETAILED DESCRIPTION

Figure 1:
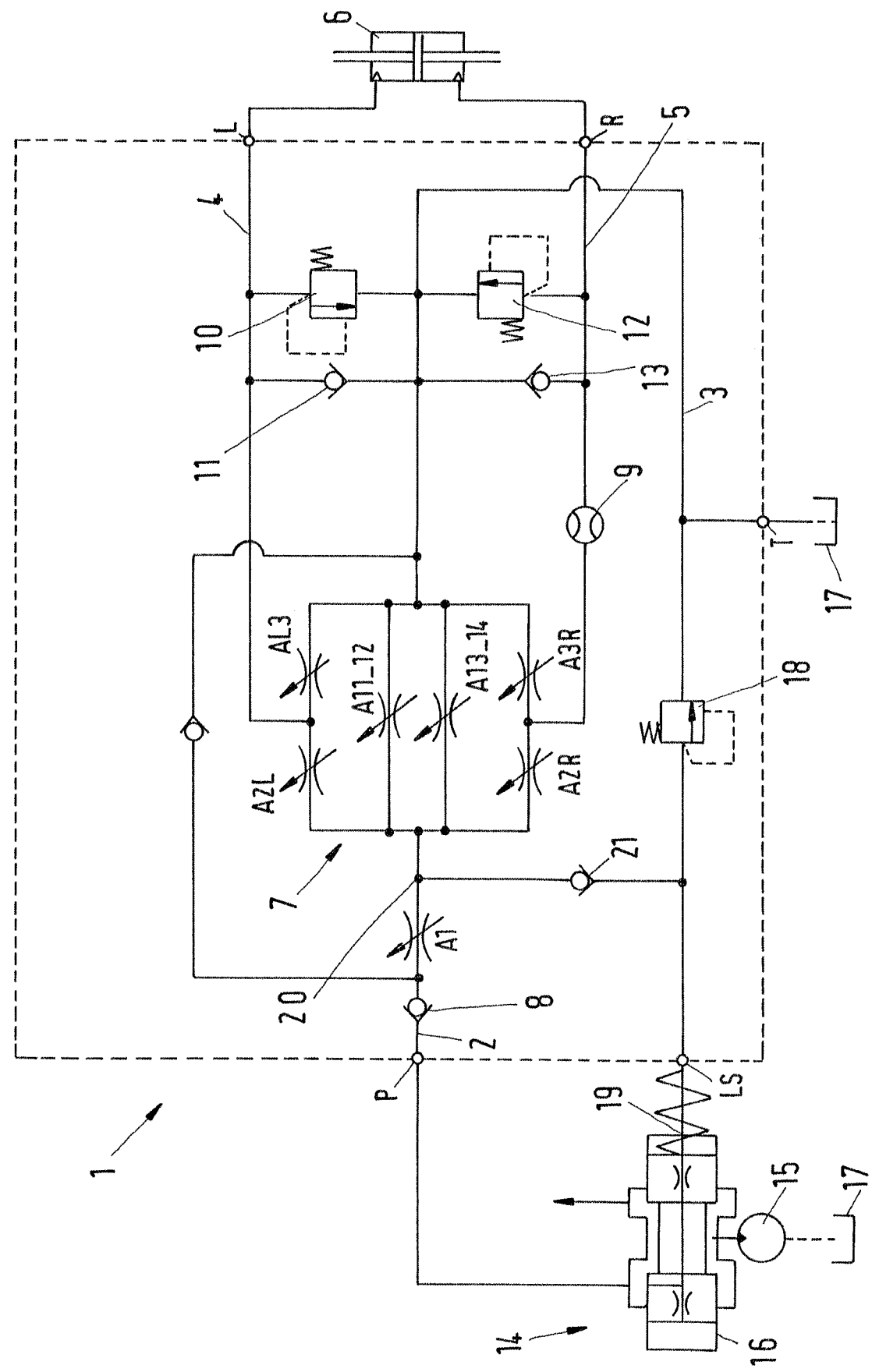
FIG. 1 shows a schematic circuit diagram of a steering unit.

FIG. 1 schematically shows a hydraulic steering unit 1 comprising a supply port arrangement having a pressure port P connected to a main flow path 2 and a tank port T connected to a tank flow path 3. The steering unit 1 furthermore comprises a working port arrangement having a left working port L connected to a left working flow path 4 and a right working port L connected to a right working flow path 5. The working port arrangement having the two working ports L, R can be connected to a steering motor 6, for example in form of a double acting hydraulic cylinder. Other steering motors are possible.

A bridge arrangement 7 of variable orifices is connected to the main flow path 2, to the tank flow path 3, to the left working flow path 4 and to the right working flow path 5 as will be described in more detail below.

A main orifice A1 is arranged between the pressure port P and the bridge arrangement 7. A check valve 8 opening in a direction to the bridge arrangement 7 arranged between the pressure port P and the main orifice A1.

The bridge arrangement comprises a first left orifice A2L which is connected between the main flow path 2 and the left working flow path 4. The bridge arrangement 7 further comprises a second left orifice A3L which is connected between the left working flow path 4 and the tank flow path 3. The bridge arrangement 7 comprises a first right orifice A2R which is connected between the main flow path 2 and the right working flow path 5. Furthermore, the bridge arrangement 7 comprises a second right orifice A3R connected between the right working flow path 5 and the tank flow path 3. A measuring motor 9 is arranged in the right working flow path 5. It is, however, possible to arrange the measuring motor 9 instead in the left working flow path 4.

The left working flow path 4 is connected to the tank flow path 3 via an overpressure valve 10 and via a check valve 11 opening in a direction towards the left working flow path 4. In a similar way the right working flow path 5 is connected to the tank flow path 3 via an overpressure valve 12 and via a check valve 13 opening in a direction towards the right working flow path 5.

The pressure port P is connected to a pressure source 14. In the present case the pressure source 14 comprises a pump 15 and a priority valve 16. It is, however, also possible to use a pump 15 having a variable displacement.

The tank port T is connected to a tank 17 from which the pump 15 sucks hydraulic fluid to supplied to the pressure port P. An overpressure valve 18 is arranged between the tank port T and load sensing port LS. The load sensing port LS is connected to a control port 19 of the priority valve 16. Furthermore, the load sensing port LS is connected to a point 20 between the main orifice A1 (or any other point in the main flow path 2) via a check valve 21 opening in a direction towards the bridge arrangement 7.

A diagonal orifice A11_12 is connected to the main flow path 2 and to the tank flow path 3. Furthermore, an auxiliary orifice A13_14 is arranged between the main flow path 2 and the tank flow path 3. However, the auxiliary orifice A13_14 and the diagonal orifice A11_12 have different opening behaviours, i. a. they are open in different angular ranges. They are both preferably arranged in a diagonal of the bridge arrangement.

In the following explanation a set of spool and sleeve are used as an example, wherein the orifices described above are formed between the spool and the sleeve. When the spool is rotated in relation to the sleeve, some of the orifices are opened and other orifices are closed. In this example the spool is rotated when a steering wheel is rotated, i. a. the spool is operatively connected to the steering wheel. The sleeve is operatively connected to the measuring motor 9, i. e. when the measuring motor 9 is driven by hydraulic fluid flowing from the pressure port to one of the working ports or back from the other of the working ports two tank (depending on the position of the measuring motor), the measuring motor 9 drives back the sleeve to the neutral position once the desired amount of hydraulic fluid has been supplied to the working port arrangement L, R.

Figure 2:
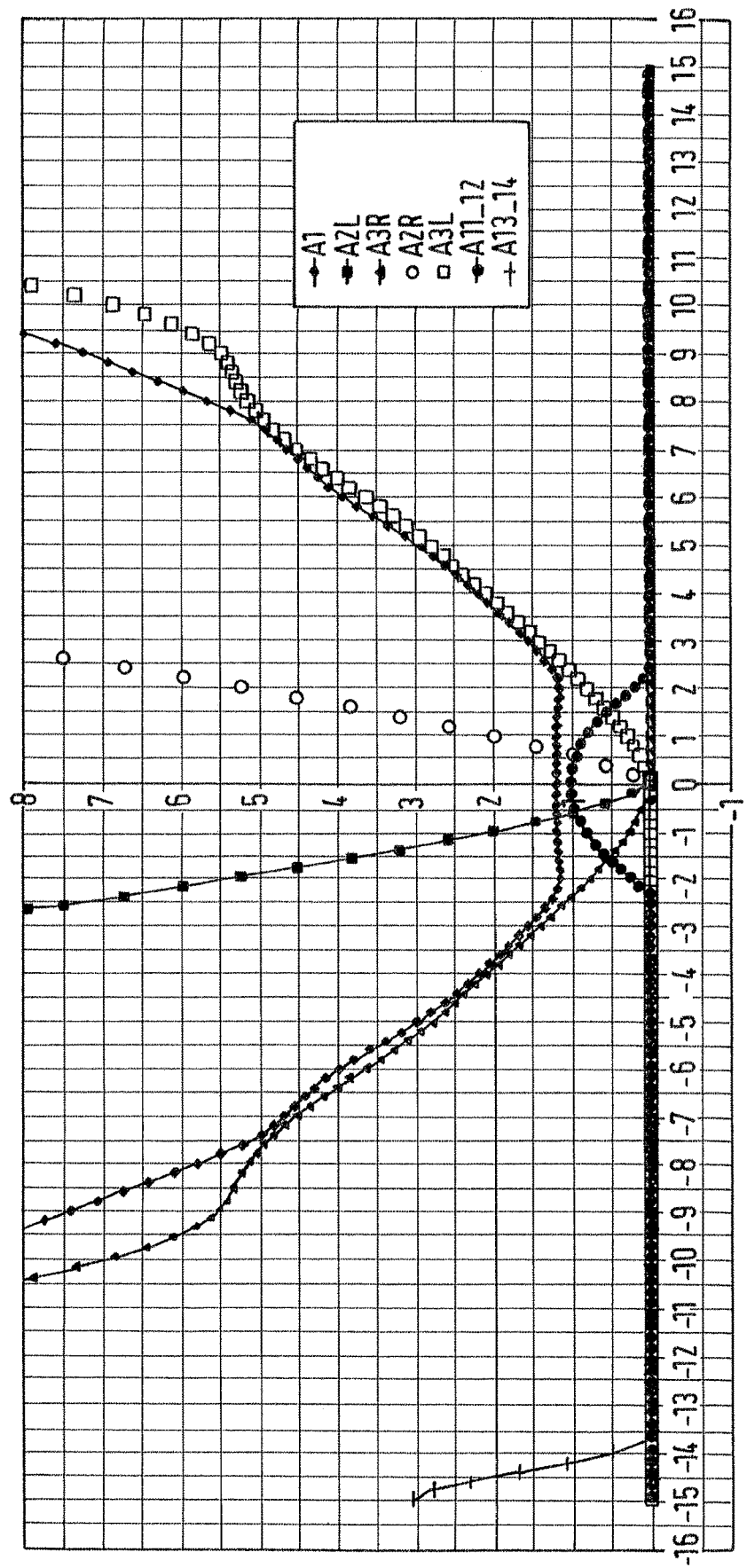
FIG. 2 shows the opening degrees of orifices of FIG. 1.

FIG. 2 shows the opening behaviour of variable orifices A1, A2L, A2R, A3L, A3R, A11_12 and A13_14. FIG. 2 shows on the horizontal axis the angular displacement between spool and sleeve from −15° to +15°. Neutral position is at 0°. The vertical axis shows the opening degrees of the orifices described above.

It can be seen that in neutral position, i. e. at an angle of 0° the orifices of bridge arrangement are closed, i. e. the first left orifice A2L, the second left orifice A3L, the first right orifice A2R and the second right orifice A3R are all closed. The main orifice A1 is open, however, with a minimal opening degree. Furthermore, the diagonal orifice A11_12 is open in neutral position.

The orifices of the bridge arrangement 7 open immediately after leaving the neutral position of 0°, i. e. they start opening at 0.25°. The diagonal orifice A11_12 is still open when the orifices of the bridge arrangement 7 start to open. However, the diagonal orifice A11_12 closes at −2.5° (steering to the left) and by +2.5° (steering to the right).

This allows a flow of hydraulic fluid from the pressure port P to the tank port T even in the neutral position (0°), so that the driver of a vehicle equipped with such a steering unit experiences a very smooth beginning of the steering.

The auxiliary orifice A13_14 opens only at −13.5° and only when the vehicle is steered to the left, i. e. the first left orifice A2L and the second right orifice A3R are open. In this case the auxiliary orifice A13_14 allows a flow of a fluid from the pressure port P to the tank flow path 3 which flow increases the pressure in the tank flow path 3. In other words: there is an "end stop" in the "branch" in which the measuring motor 9 arranged and this "end stop" is simulated by the measuring motor 9. The other "branch" comprises the auxiliary orifice A13_14. The pressure increase mentioned is not dramatic. However, the driver feels an increased resistance against a further rotation of the steering wheel. This increased resistance corresponds to a mechanical end stop feeling.

As can be seen in FIG. 2 the first left orifice A2L and the first right orifice A2R open much faster than the second right orifice A3L and the second left orifice A3L. Accordingly, the pressure drop between the pressure port P and one of the working ports L, R caused by the respective first orifice is smaller than a pressure drop on the way back of the fluid through the second orifice A3L, A3R so that the steering motor 6 is "clamped" between the pressures.

Usually such a steering unit has a dead band of approximately 3°. The use of the diagonal orifice makes it possible to reduce this dead band to approximately 0.25°. However, this depends on the start of opening of the first left orifice A2L or the first right orifice A2R, respectively, and the opening behaviour of the diagonal orifice A11_12.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic steering unit comprising a supply port arrangement having a pressure port connected to a main flow path and a tank port connected to a tank flow path, a working port arrangement having a left working port connected to a left working flow path and a right working port connected to a right working flow path, a bridge arrangement of variable orifices having a first left orifice connected to the main flow path and to the left working flow path, a first right orifice connected to the main flow path and to the right working flow path, a second left orifice connected to the left working flow path and to the tank flow path, and a second right orifice connected to the right working flow path and to the tank flow path, wherein a variable diagonal orifice is connected to the main flow path and to the tank flow path, wherein the orifices of the bridge arrangement are closed in neutral position and the diagonal orifice is open in neutral position.

2. The hydraulic steering unit according to claim 1, wherein a range around the neutral position the diagonal orifice and the orifices of the bridge arrangement are open.

3. The hydraulic steering unit according to claim 2, wherein a main orifice is arranged in the main flow path, wherein the main orifice is open in neutral position.

4. The hydraulic steering unit according to claim 2, wherein a measuring motor is arranged in one of the working flow paths.

5. The hydraulic steering unit according to claim 2, wherein an auxiliary orifice is arranged between the main flow path and the tank flow path, wherein the auxiliary orifice and the diagonal orifice are open in different angular ranges.

6. The hydraulic steering unit according to claim 1, wherein the first left orifice opens faster than the second right orifice and the first right orifice opens faster than the second left orifice.

7. The hydraulic steering unit according to claim 6, wherein a main orifice is arranged in the main flow path, wherein the main orifice is open in neutral position.

8. The hydraulic steering unit according to claim 6, wherein a measuring motor is arranged in one of the working flow paths.

9. The hydraulic steering unit according to claim 6, wherein an auxiliary orifice is arranged between the main flow path and the tank flow path, wherein the auxiliary orifice and the diagonal orifice are open in different angular ranges.

10. The hydraulic steering unit according to claim 1, wherein a main orifice is arranged in the main flow path, wherein the main orifice is open in neutral position.

11. The hydraulic steering unit according to claim 10, wherein a measuring motor is arranged in one of the working flow paths.

12. The hydraulic steering unit according to claim 10, wherein an auxiliary orifice is arranged between the main flow path and the tank flow path, wherein the auxiliary orifice and the diagonal orifice are open in different angular ranges.

13. The hydraulic steering unit according to claim 1, wherein a measuring motor is arranged in one of the working flow paths.

14. The hydraulic steering unit according to claim 13, wherein an auxiliary orifice is arranged between the main flow path and the tank flow path, wherein the auxiliary orifice and the diagonal orifice are open in different angular ranges.

15. The hydraulic steering unit according to claim 1, wherein an auxiliary orifice is arranged between the main flow path and the tank flow path, wherein the auxiliary orifice and the diagonal orifice are open in different angular ranges.

16. The hydraulic steering unit according to claim 15, wherein the auxiliary orifice is open only in an outermost angular range.

17. The hydraulic steering unit according to claim 16, wherein the auxiliary orifice allows a flow of fluid only into a working flow path in which the measuring motor is not arranged.

* * * * *